US010234656B2

(12) United States Patent
Yang (10) Patent No.: US 10,234,656 B2
(45) Date of Patent: Mar. 19, 2019

(54) CAMERA LENS

(71) Applicant: HON HAI PRECISION INDUSTRY CO., LTD., New Taipei (TW)

(72) Inventor: Wan-Chien Yang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/801,412

(22) Filed: Nov. 2, 2017

(65) Prior Publication Data

US 2019/0025548 A1    Jan. 24, 2019

Related U.S. Application Data

(60) Provisional application No. 62/533,724, filed on Jul. 18, 2017.

(51) Int. Cl.
  *G02B 3/02* (2006.01)
  *G02B 13/00* (2006.01)
  *G02B 9/62* (2006.01)
  *G02B 27/00* (2006.01)

(52) U.S. Cl.
  CPC .......... *G02B 13/0045* (2013.01); *G02B 9/62* (2013.01); *G02B 27/0025* (2013.01)

(58) Field of Classification Search
  CPC .................................................. G02B 13/0045
  USPC .......................................................... 359/714
  See application file for complete search history.

(56) References Cited

U.S. PATENT DOCUMENTS

2016/0170176 A1*  6/2016  Liao ................... G02B 13/0045
                                                                    348/360

* cited by examiner

*Primary Examiner* — James Jones
(74) *Attorney, Agent, or Firm* — ScienBiziP, P.C.

(57) ABSTRACT

A camera lens with a single optical axis includes a first lens having a positive refractive power, a second lens having a positive refractive power, a third lens having a negative refractive power, a fourth lens having a positive refractive power, and a fifth lens having a negative refractive power. The first lens, the second lens, the third lens, the fourth lens, the fifth lens, and an image sensor are arranged in sequence from an object side to an image side, where an axial distance between the third lens and the fourth lens is CT34, an axial distance between the fourth lens and the fifth lens is CT45, and the following condition is satisfied: 8.3<CT34/CT45<15.7.

17 Claims, 10 Drawing Sheets

CAMERA LENS

FIELD

The subject matter herein generally relates to optics and a camera lens.

BACKGROUND

A lens module mounted in a camera of a mobile communications terminal includes a plurality of lenses. For example, a lens module includes a plurality of lenses in order to configure an optical system having high resolution. Nowadays, lenses are thinner, and large f-numbers are the trend to make better light-sensing lenses. Also, a large field of view lenses is required to meet selfie requirements. However, it is difficult for optical camera lens to meet all these requirements with good manufacturability. Therefore, there is a need in the art for the development of a lens module having an optical system which able to correct lens color aberrations, distortion, and astigmatism.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to illustrate details and features of the present disclosure better. The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising" when utilized, means "including, but not necessarily limited to"; it specifically indicates open-ended inclusion or membership in the so-described combination, group, series, and the like.

Figure 1:
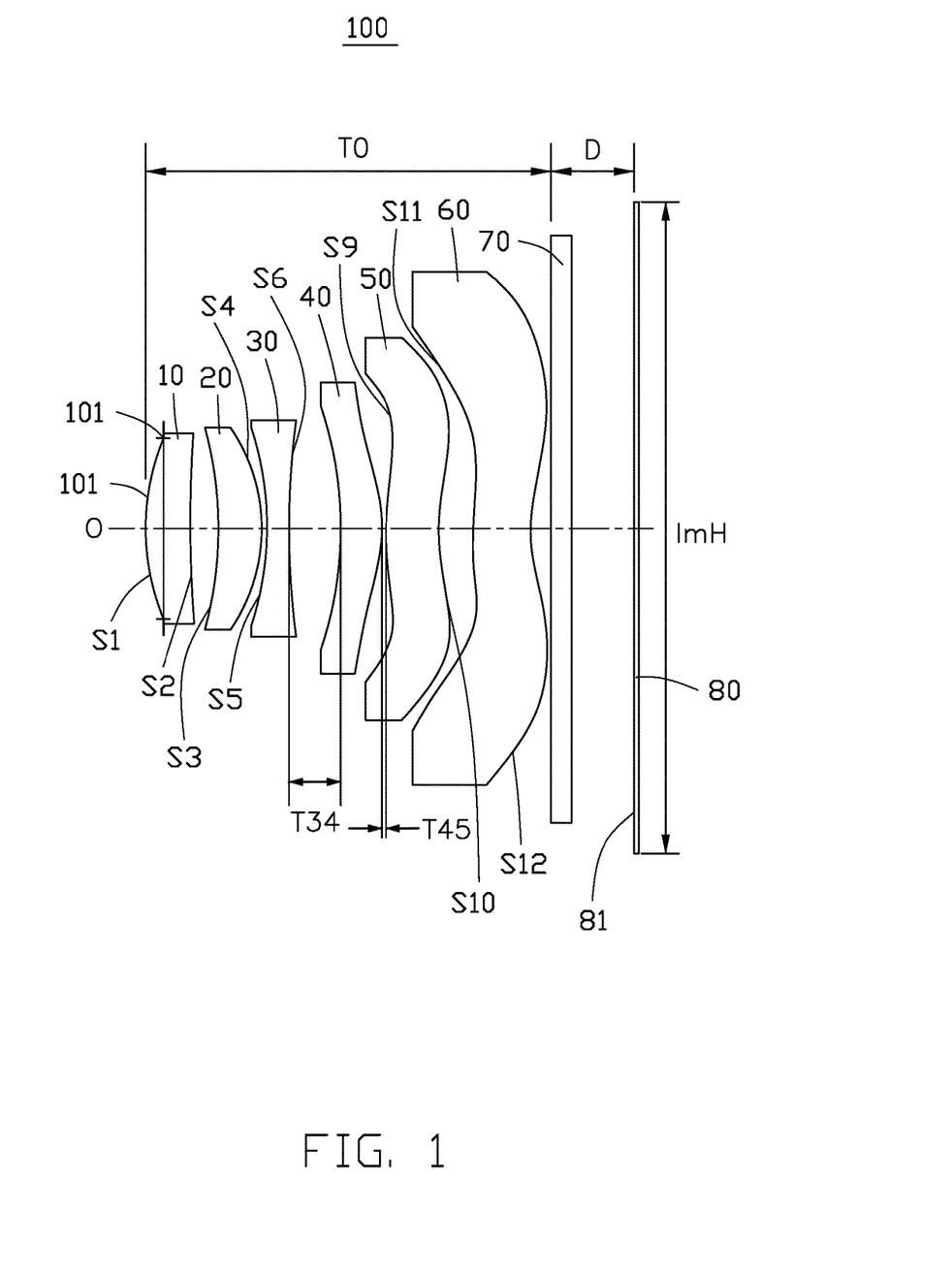
FIG. 1 is a diagram of a lens layout of a camera lens in accordance with an exemplary embodiment of the present disclosure.

FIG. 1 illustrates a lens layout of a camera lens 100 in accordance with an exemplary embodiment of the present disclosure.

The camera lens 100 comprises an aperture 101, a first lens 10, a second lens 20, a third lens 30, a fourth lens 40, a fifth lens 50, a sixth lens 60, an optical filter 70, and an image sensor 80. The first lens 10, the second lens 20, the third lens 30, the fourth lens 40, the fifth lens 50, the sixth lens 60, the optical filter 70 and the image sensor 80 are arranged in sequence from an object side to an image side. The aperture 101 is arranged at the object side of the first lens 10.

As shown in FIG. 1, the first lens 10 is a convex-concave lens and has a positive refractive power. A convex surface S1 faces the object side, and a concave surface S2 faces the image side. The two surfaces S1 and S2 are aspheric surfaces.

Figure 2:
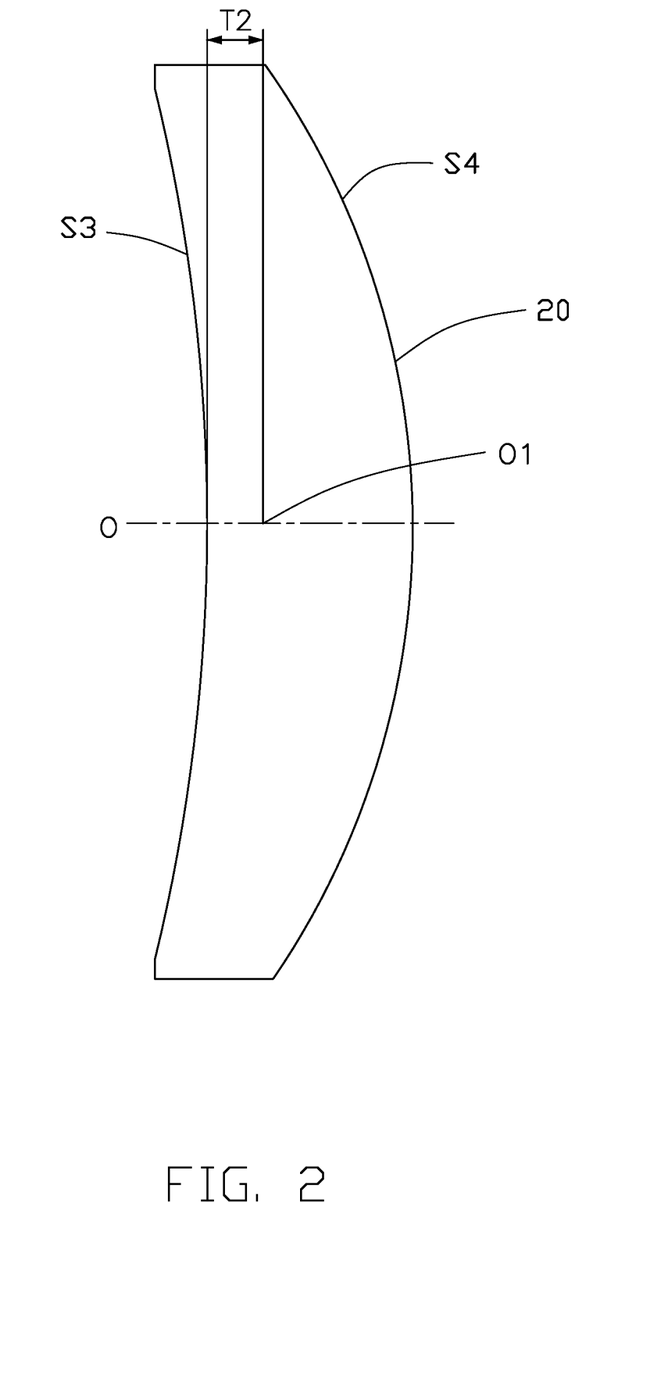
FIG. 2 is a cross-sectional view of the second lens in the camera lens of FIG. 1.

As shown in FIG. 2, the second lens 20 is a concave-convex lens and has a positive refractive power. A concave surface S3 faces the object side, and a convex surface S4 faces the image side. The two surfaces S3 and S4 are aspheric surfaces.

Figure 3:
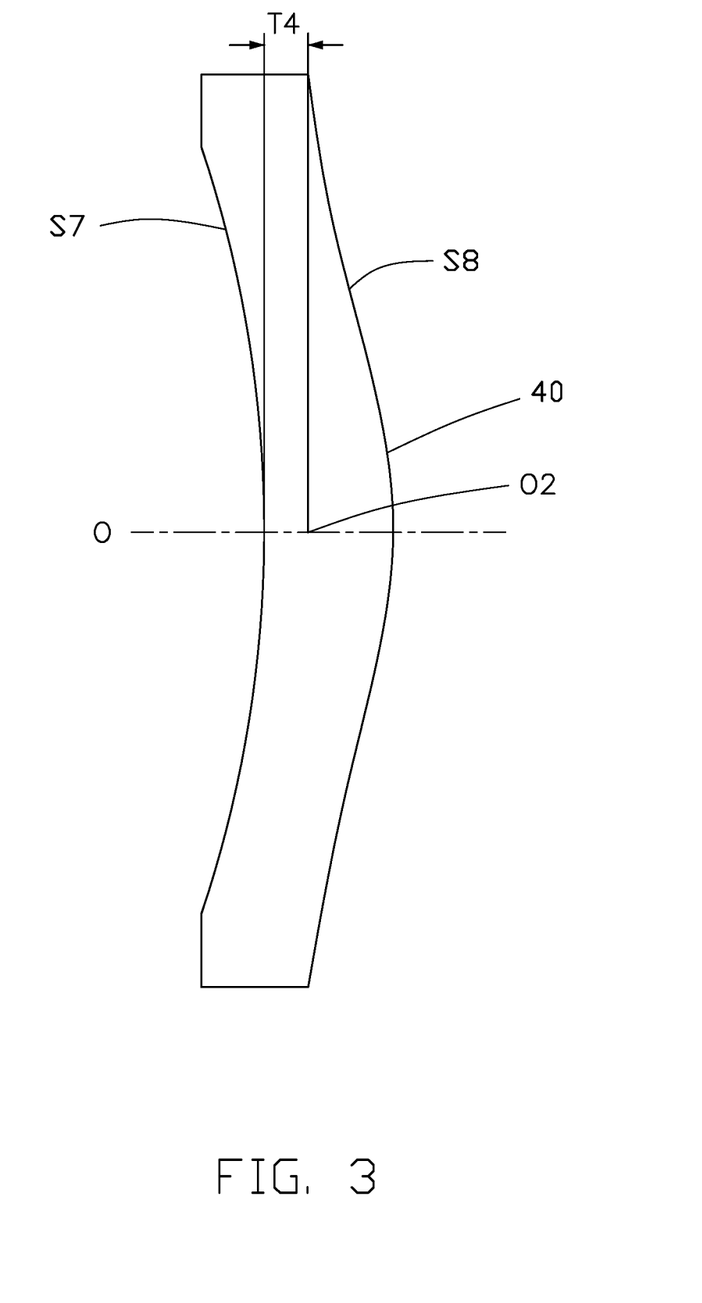
FIG. 3 is a cross-sectional view of the fourth lens in the camera lens of FIG. 1.

As shown in FIG. 3, the third lens 30 is a concave-concave lens. A concave surface S5 faces the object side, and a concave surface S6 faces the image side. The two surfaces S5 and S6 are aspheric surfaces.

As shown in FIG. 1, the fourth lens 40 is a concave-convex lens and has a positive refractive power. A concave surface S7 faces the object side, and a convex surface S8 faces the image side. The two surfaces S7 and S8 are aspheric surfaces.

As shown in FIG. 1, the fifth lens 50 has a negative refractive power. The fifth lens 50 is a bi-concave lens. A concave surface S9 faces the object side, and a concave surface S10 faces the image side. The fifth lens 50 can be made of glass or plastic. The concave surface S9 may have an inflection point thereon. The convex surface S10 may have an inflection point thereon.

As shown in FIG. 1, the sixth lens 60 has a negative refractive power. The sixth lens 60 is a concave-convex lens. A concave surface S11 faces the object side, and a convex surface S12 faces the image side. The two surfaces S11 and S12 are aspheric surfaces. The sixth lens 60 can be made of plastic. The concave surface S11 may have an inflection point thereon. The convex surface S12 may have an inflection point thereon.

The image sensor 80 is a charge coupled device (CCD) or a complementary metal-oxide semiconductor (CMOS) device or any photo sensor capable of sensing luminance and converting same into an electric signal.

As shown in FIG. 1, an axial distance between the third lens 30 and the fourth lens 40 is CT34, an axial distance between the fourth lens 40 and the fifth lens 50 is CT45. The camera lens 100 satisfies the following condition:

$$8.3 < CT34/CT45 < 15.7 \quad \text{(hereinafter, condition (1))}$$

The camera lens 100 satisfies condition (1), the distribution ratio of the refractive powers of the fourth lens 40 and the fifth lens 50 is optimized, the distortion of the camera lens 100 can be effectively corrected, and a loss of imaging effect is reduced.

A central thickness between the first surface S1 and the twelfth surface S12 is T0. The image sensor 80 comprises an image plane 81, and a central thickness between the twelfth surface S12 and the image plane 81 is D. The camera lens 100 satisfies the following condition:

$$0.21 < D/T0 < 0.26 \quad \text{(condition (2))}$$

The camera lens 100 satisfies condition (2), a distance from an object-side surface of a first lens to an image plane of the camera lens 100 is optimized.

As shown in FIG. 2 and FIG. 3, the maximum effective diameter of the fourth surface S4 intersects with the optical axis O and the intersection point is O1, and an axial distance between the third surface S3 and the intersection O1 is T2, and the following condition is satisfied:

$$0.12 \text{ mm} < T2 < 0.22 \text{ mm} \quad \text{(condition (3))}$$

The maximum effective diameter of where the eighth surface intersects with the optical axis O is O2, and an axial distance between the seventh surface S7 and the intersection O2 is T4, and the following condition is satisfied:

$$0.13 \text{ mm} < T4 < 0.21 \text{ mm} \quad \text{(condition (4))}.$$

Conditions (3) and (4) are configured to limit the curvature radius range between the second lens 20 and the fourth lens 40, to improve the refractive power of the second lens 20 and the fourth lens 40.

A central thickness of the second lens is CT2, a central thickness of the third lens is CT3. Such central thickness is limited by imaging quality and the difficulty of manufacture. To achieve the tolerance optimization between the distribution of lenses, the following condition is satisfied:

$$0.48 < CT3/CT2 < 0.53 \quad \text{(condition (5))}.$$

A focal length of the first lens is F1, a focal length of the second lens is F2, a focal length of the third lens is F3, the focal length of the fourth lens is F4, a focal length of the fifth lens is F5, and a focal length of the sixth lens is F6. To reduce an eccentricity sensitivity of the camera lens 100, the following condition is satisfied:

$$0.2 \text{ mm} < |F1+F2+F4|/|F3+F5+F6| < 0.47 \text{ mm} \quad \text{(condition (6))}.$$

A curvature radius of the first surface S1 is L1R1, a curvature radius of the third surface S3 is L2R1, a curvature radius of the fifth surface S5 is L3R1, a curvature radius of the seventh surface S7 is L4R1, a curvature radius of the ninth surface S9 is L5R1, and a curvature radius of the eleventh surface S11 is L6R1. To correct all aberrations while obtaining a viewing angle of more than 78°, the following condition is satisfied:

$$L5R1/F5 < L4R1/F4 < L6R1/F6 < 0 \quad \text{(condition (7))}$$

$$2.31 < L1R1/F1 < 2.84; \quad \text{(condition (8))}$$

$$-0.67 < L2R1/F2 < 0.72; \quad \text{(condition (9))}$$

$$0.13 < L3R1/F3 < 0.21; \quad \text{(condition (10))}$$

$$-10.2 < L4R1/F4 < -8.77; \quad \text{(condition (11))}$$

$$-22.3 < L5R1/F5 < -19.7 \quad \text{(condition (12)); and}$$

$$-3.54 < L6R1/F6 < 2.21 \quad \text{(condition (13))}.$$

In order to limit a relationship between the imaging height and a total length of the camera lens, the following condition is satisfied:

$$1.26 < ImH/T0 < 2.51 \quad \text{(condition (14))},$$

in which ImH denotes the maximum image height of the camera lens.

The camera lens 100 also meets the follow conditions:

$$30 < Vd3 - Vd2 < 50; \quad \text{(condition (15))}$$

$$30 < Vd6 - Vd5 < 50 \quad \text{(condition (16)); and}$$

$$70 < Vd1 + Vd4 < 90 \quad \text{(condition (17))}.$$

wherein Vd2 denotes an Abbe constant of the second lens; Vd3 denotes an Abbe constant of the third lens; Vd1 denotes an Abbe constant of the first lens; and Vd4 denotes an Abbe constant of the fourth lens. Vd5 denotes an Abbe constant of the fifth lens; and Vd6 denotes an Abbe constant of the sixth lens. When conditions (15), (16), and (17) are satisfied, both axial color aberration and magnification color aberration may be easily corrected.

The half viewing angle of the wide-angle viewing system is ω. The camera lens further satisfies:

$$78° < 2\omega < 90° \quad \text{(condition (18))};$$

The camera lens further comprises an aperture 101 arranged at the object side of the first lens 10, and the aperture value meets the criterion of:

$$F/NO < 2.21. \quad \text{(condition (19))}$$

Figure 4:
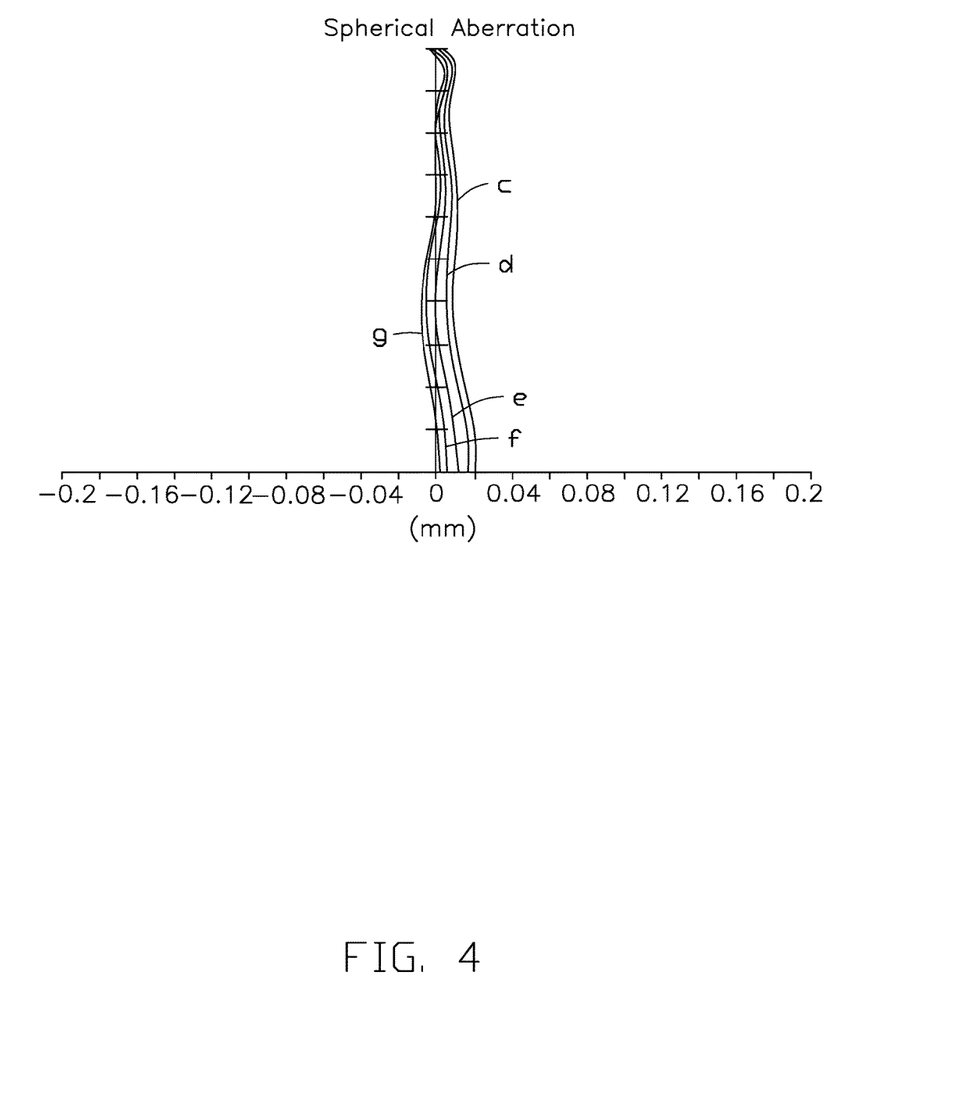
FIG. 4 depicts a longitudinal aberration diagram of the camera lens of FIG. 1.
Figure 5:
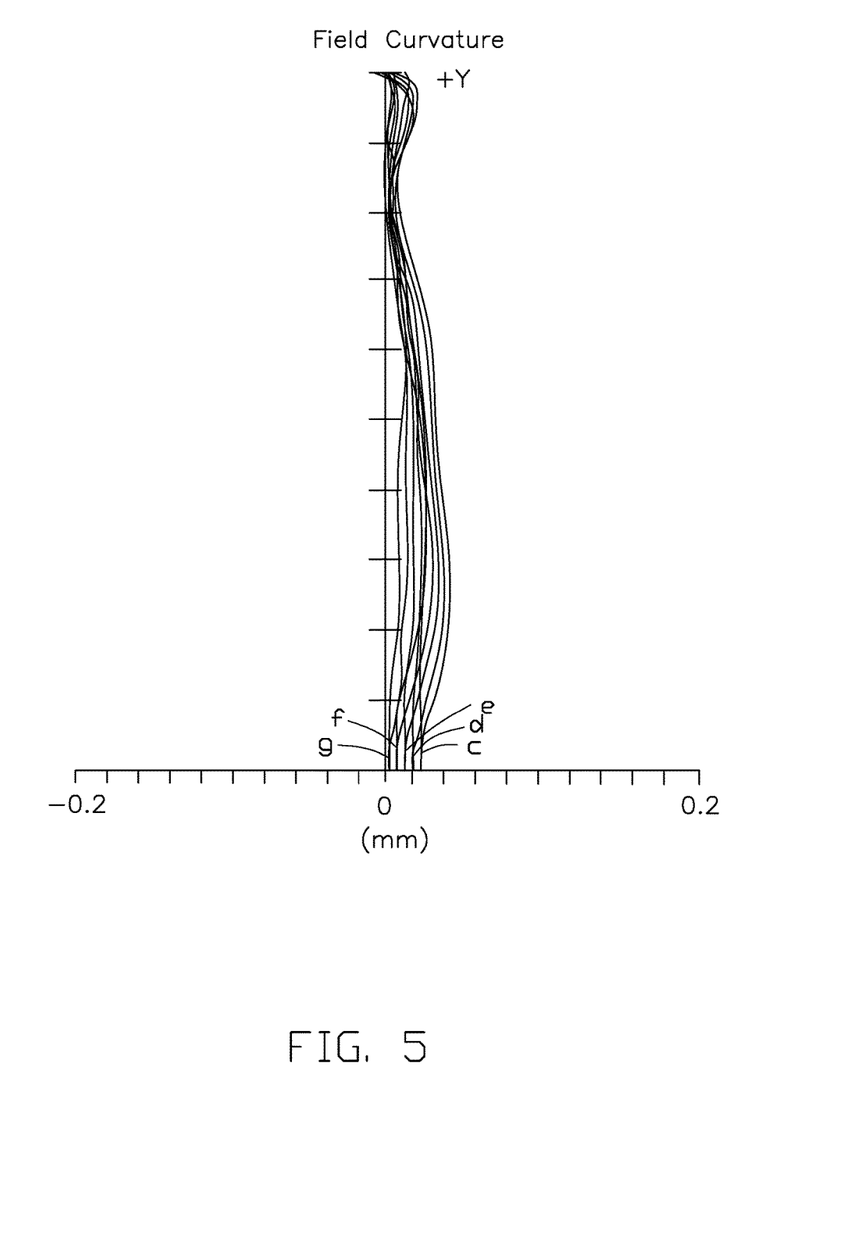
FIG. 5 is a field curvature diagram of the camera lens of FIG. 1.
Figure 6:
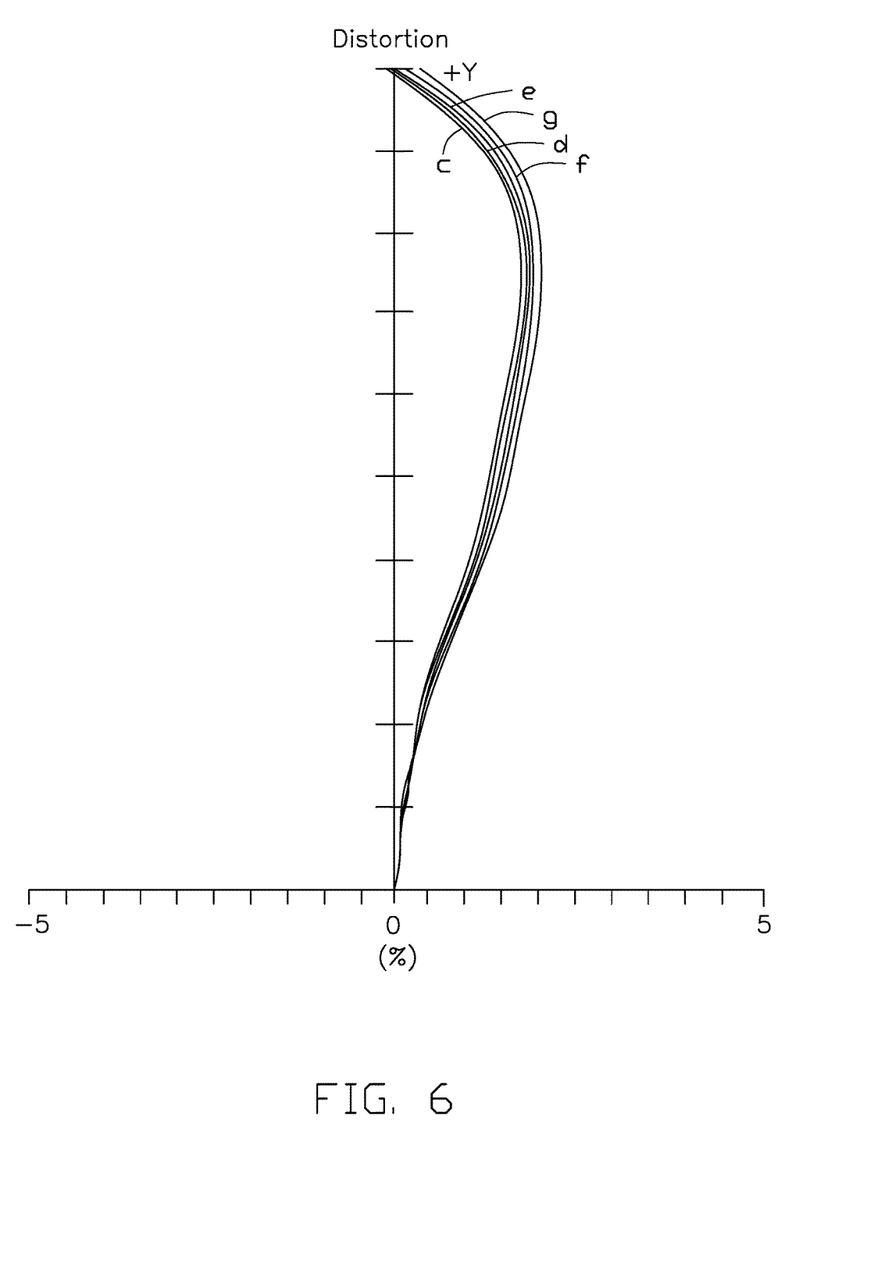
FIG. 6 is a distortion diagram of the camera lens of FIG. 1.

The spherical aberration diagram, the field curvature diagram, and the distortion diagram of the camera lens 100 are respectively shown in FIG. 4 to FIG. 6. Spherical aberrations of line g (λ=470.0 nm), line f (λ=510.0 nm), line e (λ=555.0 nm), line d (λ=610.0 nm) and line e (λ=650.0 nm) are shown in FIG. 4.

Generally, spherical aberration of visible light (with a wavelength of between 400~700 nm) of the camera lens 100 in the first embodiment is within a range of −0.02 mm to 0.02 mm.

The sagittal field curvature and tangential field curvature shown in FIG. 5 are kept within a range of 0 mm to 0.01 mm.

The distortion in FIG. 6 falls within a range of 0% to 2%. Spherical aberration, field curvature, and distortion are strictly controlled in the first embodiment of the camera lens 100.

In at least one embodiment, a curvature radius R of each lens surfaces, a distance d in an optical axis between each adjacent lens surfaces, a refractive index Nd of each lens, and an Abbe constant of each lens are shown in Table 1.

TABLE 1

| Surface | Curvature radius (mm) | Thickness(mm) | Refractive index | Abbe constant | Conic constant |
|---|---|---|---|---|---|
| Object | Infinity | Infinity | — | — | — |
| Aperture | Infinity | −0.21 | — | — | — |
| S1 | 1.86 | 0.45 | 1.54 | 56.0 | −0.31 |
| S2 | 6.17 | 0.29 | — | — | −0.32 |
| S3 | −11.72 | 0.48 | 1.54 | 56.0 | — |
| S4 | −2.21 | 0.02 | — | — | −1.28 |
| S5 | −40.33 | 0.23 | 1.64 | 22.4 | — |
| S6 | 3.78 | 0.52 | — | — | 8.33 |
| S7 | −2.34 | 0.42 | 1.64 | 22.4 | −0.17 |
| S8 | −2.15 | 0.06 | — | — | −0.86 |

TABLE 1-continued

| Surface | Curvature radius (mm) | Thickness(mm) | Refractive index | Abbe constant | Conic constant |
|---|---|---|---|---|---|
| S9 | 2.87 | 0.56 | 1.64 | 23.3 | −1.46 |
| S10 | 2.45 | 0.33 | — | — | −3.29 |
| S11 | 2.79 | 0.63 | 1.53 | 56.1 | −26.71 |
| S12 | 1.62 | 0.38 | — | — | −8.17 |
| IR-cut | Infinity | 0.21 | 1.52 | 58.6 | — |
| Air | Infinity | 0.69 | — | — | — |
| Image | Infinity | — | — | — | — |

Formula definition of aspheric surfaces is:

$$Z = \frac{h^2/R}{1+\sqrt{1-(1+K)(h/R)^2}} + Ah^4 + Bh^6 + Ch^8 + Dh^{10} + Eh^{12} + Fh^{14} + Gh^{16}$$

Of the above formula, Z is an aspheric surface sag of each lens surface; R is a radius of curvature; and h is a radial distance of the lens surface from the optical axis. K is a conic constant; and A, B, C, D, E, F, G are aspheric coefficients of each lens surface.

In at least one embodiment, aspheric coefficients of each lens surface are shown in Table 2.

TABLE 2

| Aspheric coefficient | S1 | S2 | S3 | S4 | S5 | S6 |
|---|---|---|---|---|---|---|
| A4 | −1.80−E3 | −0.0326 | −0.0326 | −0.0204 | −0.158 | −0.148 |
| A6 | −0.0296 | −7.86−E3 | −0.0182 | −0.0591 | 9.10E−4 | 0.0421 |
| A8 | 0.0238 | −0.0403 | −0.0200 | 0.0331 | 0.0106 | −0.0259 |
| A10 | −0.032 | 0.012 | 4.51E−3 | −0.0163 | 0.0151 | 0.0155 |

| Aspheric coefficient | S7 | S8 | S9 | S10 | S11 | S12 |
|---|---|---|---|---|---|---|
| A4 | 0.154 | 0.0353 | −0.109 | −0.0807 | −0.0115 | −0.0594 |
| A6 | −0.0504 | 0.0261 | 0.0187 | 0.0125 | 0.0167 | 0.0107 |
| A8 | 3.14E−3 | −9.68E−3 | −5.96E−3 | −2.69E−3 | 3.29E−3 | −9.06E−4 |
| A10 | −1.22E−3 | 4.74E−4 | 8.93E−4 | 2.72E−4 | −1.34E−4 | 2.06E−5 |

In at least one embodiment, Focal Length, aperture value, the maximum image height ImH, and a field of viewing angle ω in one embodiment are shown in Table 3.

TABLE 3

| F(mm) | F/NO | 2ω | ImH(mm) | D(mm) | F1 | F2 | F3 | F4 |
|---|---|---|---|---|---|---|---|---|
| 4.10 | 2.2 | 81.37 | 7.026 | 0.9 | 4.71 | 4.89 | −5.33 | 21.79 |

| F5 | F6 | CT2(mm) | CT3(mm) | CT34(mm) | CT45(mm) | T0(mm) | T2(mm) | T4(mm) |
|---|---|---|---|---|---|---|---|---|
| −56.70 | −8.87 | 0.48 | 0.23 | 0.53 | 0.06 | 4.17 | 0.21 | 0.14 |

Figure 7:
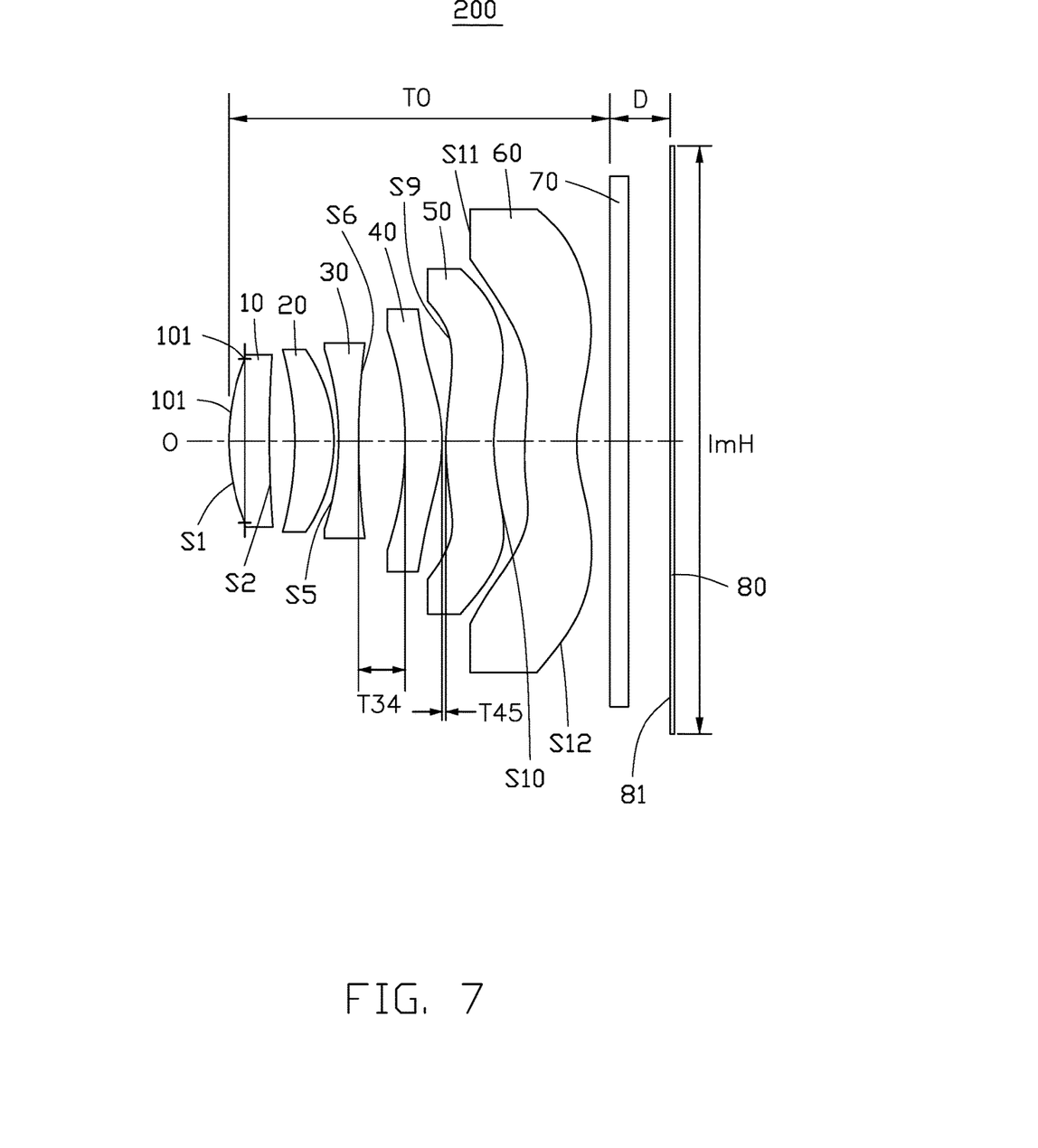
FIG. 7 is a lens layout diagram of the camera lens of FIG. 1.

FIG. 7 illustrates a camera lens 200 according to a second exemplary embodiment. The camera lens 200 is similar to the camera lens 100 in FIG. 1. The differences between the camera lens 200 and the camera lens 100 in FIG. 1 are that curvature radiuses, central distance d between each adjacent lens surface, refractive indexes, and Abbe numbers are different from those of the camera lens 100.

In the camera lens 200, a curvature radius R of each lens surface, a distance d in an optical axis between each adjacent lens surface, a refractive index Nd of each lens, and an Abbe constant of each lens are shown in Table 4.

TABLE 4

| Surface | Curvature radius (mm) | Thickness (mm) | Refractive index | Abbe constant | Conic constant |
|---|---|---|---|---|---|
| Object | Infinity | Infinity | — | — | — |
| Aperture | Infinity | −0.20 | — | — | — |
| S1 | 1.89 | 0.49 | 1.54 | 56.0 | −0.30 |
| S2 | 6.34 | 0.3 | — | — | 1.79 |
| S3 | −9.33 | 0.48 | 1.54 | 56.0 | — |
| S4 | −2.14 | 0.04 | — | — | −1.35 |
| S5 | −35.57 | 0.25 | 1.64 | 22.4 | — |
| S6 | 3.79 | 0.55 | — | — | 8.09 |
| S7 | −2.27 | 0.44 | 1.64 | 22.4 | −0.19 |
| S8 | −2.11 | 0.05 | — | — | −0.89 |
| S9 | 3.20 | 0.57 | 1.64 | 23.3 | −1.33 |
| S10 | 2.76 | 0.35 | — | — | −3.99 |
| S11 | 3.11 | 0.63 | 1.53 | 56.1 | −33.6 |
| S12 | 1.70 | 0.21 | — | — | −8.87 |
| IR-cut | Infinity | 0.21 | 1.52 | 58.6 | — |
| Air | Infinity | 0.69 | — | — | — |
| Image | Infinity | — | — | — | — |

In the camera lens 200, aspheric coefficients of each lens surface are shown in Table 5.

TABLE 5

| Aspheric coefficient | S1 | S2 | S3 | S4 | S5 | S6 |
|---|---|---|---|---|---|---|
| A4 | −1.70E−3 | −0.0301 | −0.0308 | −0.0197 | −0.1563 | −0.1491 |
| A6 | −0.0286 | −3.64E−3 | −0.0180 | −0.0578 | 8.18E−4 | 0.0413 |
| A8 | 0.0259 | −0.0363 | −0.0181 | 0.0348 | 0.0157 | −0.0264 |

TABLE 5-continued

| A10 | −0.0279 | 0.0122 | 8.27E−3 | −0.0133 | 0.0146 | 0.0146 |

| Aspheric coefficient | S7 | S8 | S9 | S10 | S11 | S12 |
|---|---|---|---|---|---|---|
| A4 | 0.154 | 0.0358 | −0.109 | −0.0809 | −0.115 | −0.0586 |
| A6 | −0.0496 | 0.0262 | 0.0194 | 0.0125 | 0.0168 | 0.0106 |
| A8 | 3.45E−3 | −9.54E−3 | −5.84E−3 | −2.67E−3 | 3.38E−4 | −9.20E−4 |
| A10 | −1.10E−3 | 5.6E−4 | 8.4E−4 | 2.95E−4 | −1.31E−4 | 2.03E−5 |

In the camera lens 200, Focal Length, aperture value, the maximum image height ImH, and a field of viewing angle ω in one embodiment are shown in Table 6.

TABLE 6

| F(mm) | F/NO | 2ω | ImH(mm) | D(mm) | F1 | F2 | F3 | F4 |
|---|---|---|---|---|---|---|---|---|
| 4.32 | 2.2 | 78.44° | 7.026 | 0.94 | 4.70 | 4.96 | −5.27 | 22.41 |

| F5 | F6 | CT2(mm) | CT3(mm) | CT34(mm) | CT45(mm) | T0(mm) | T2(mm) | T4(mm) |
|---|---|---|---|---|---|---|---|---|
| −66.32 | −8.30 | 0.48 | 0.25 | 0.55 | 0.05 | 4.32 | 0.16 | 0.15 |

Figure 8:
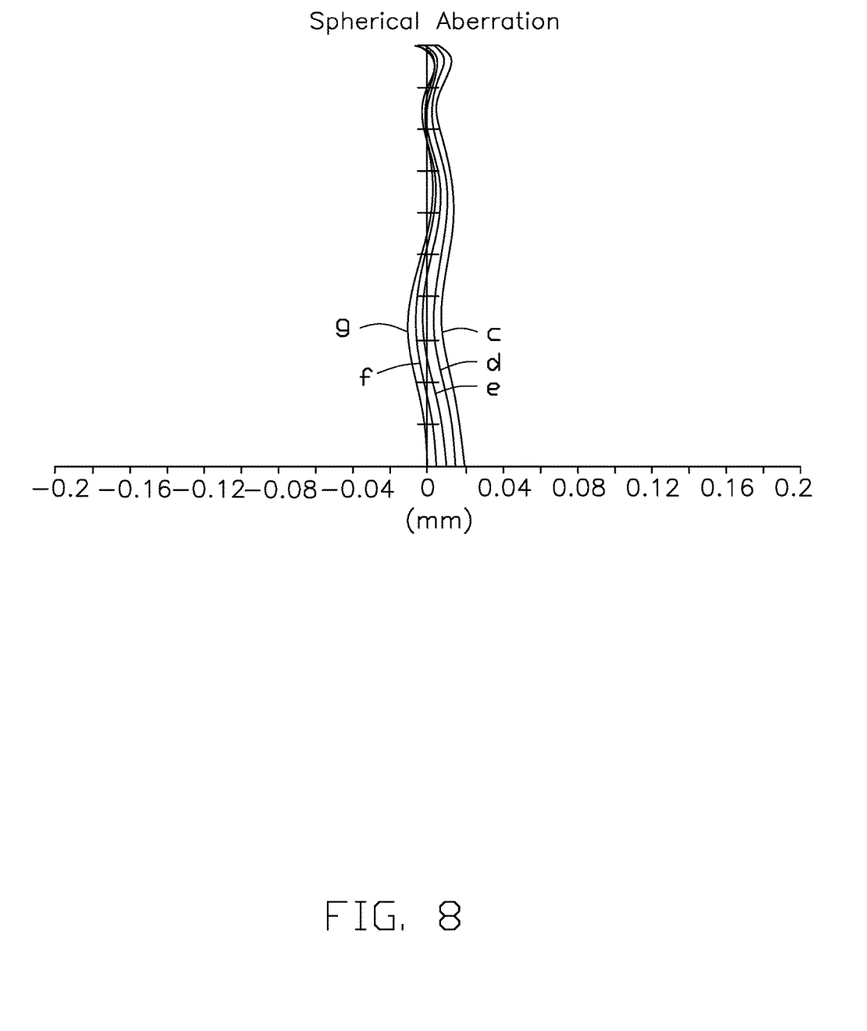
FIG. 8 depicts a longitudinal aberration diagram of a camera lens in accordance with an exemplary embodiment of the present disclosure.
Figure 9:
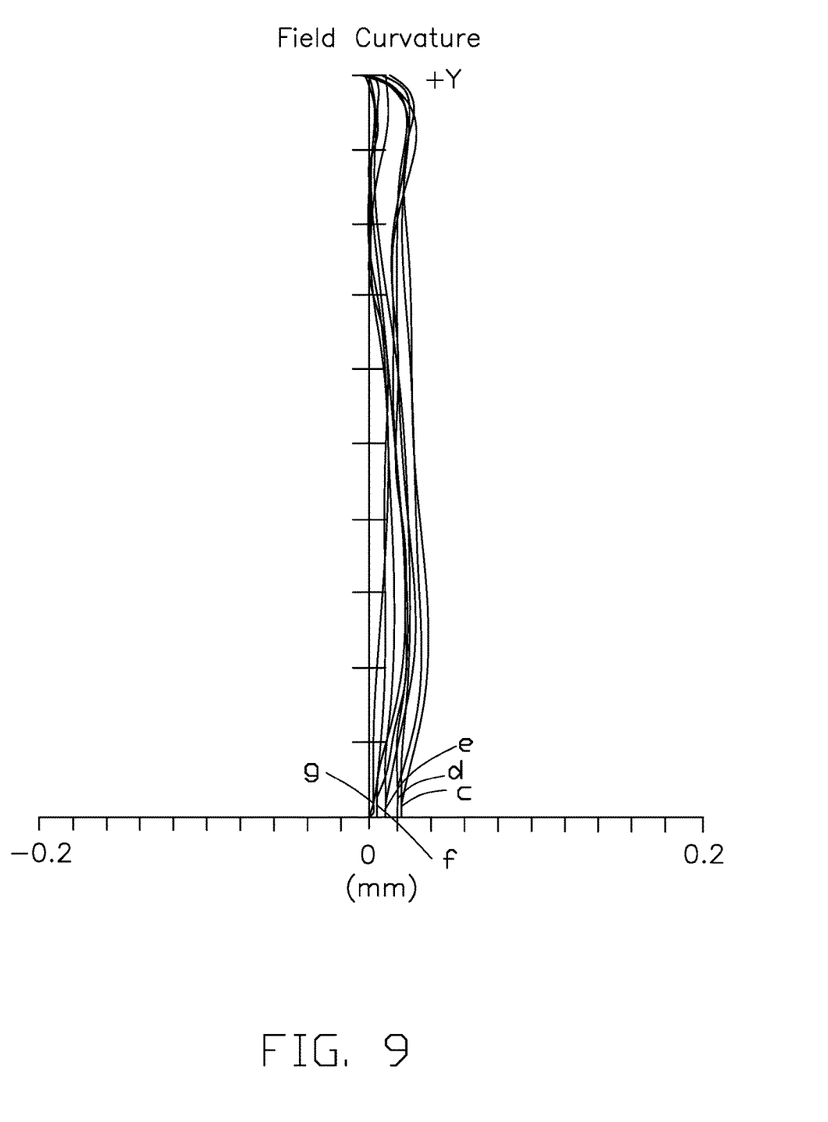
FIG. 9 is a field curvature diagram of the camera lens of FIG. 8.
Figure 10:
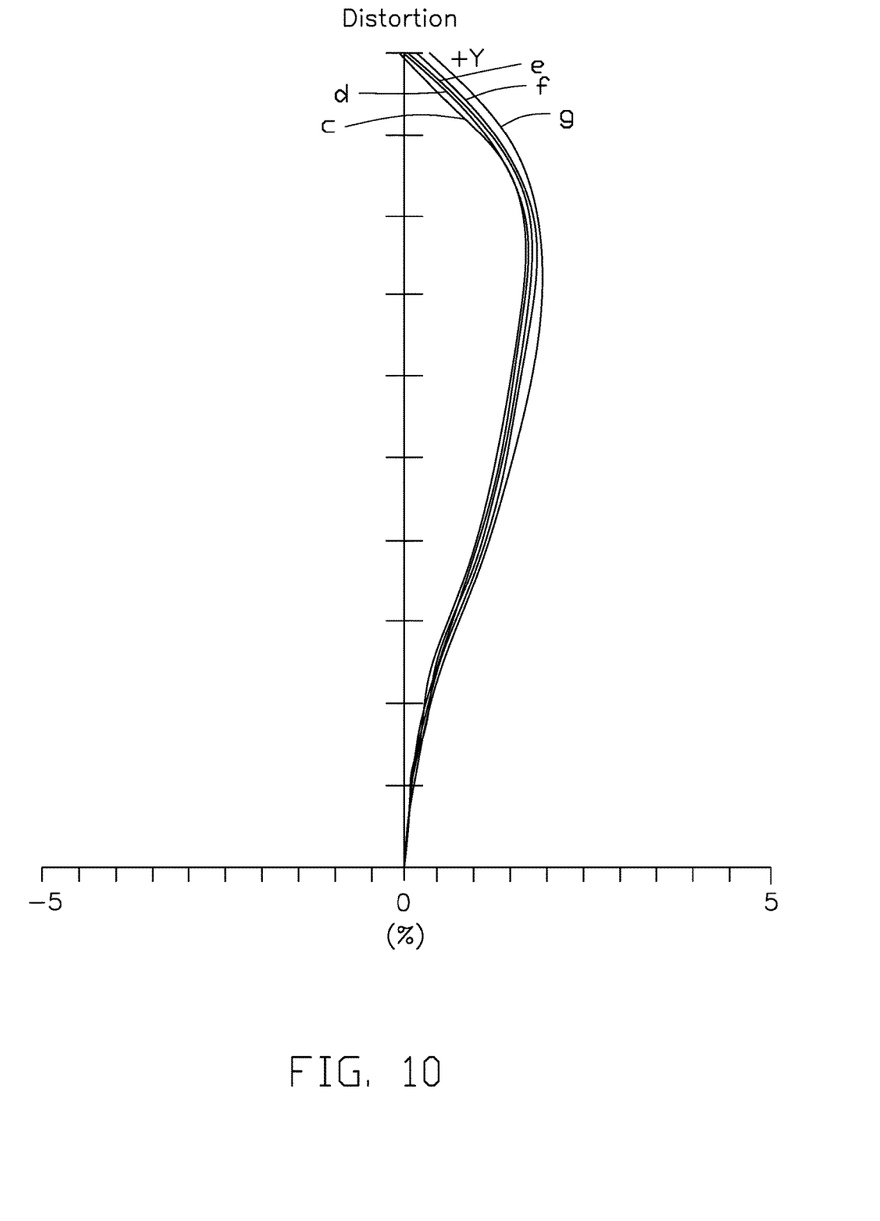
FIG. 10 is a distortion diagram of the camera lens of FIG. 8.

The spherical aberration diagram, the field curvature diagram, and the distortion diagram of the camera lens 200 are respectively shown in FIG. 8 to FIG. 10. Spherical aberrations of line g (λ=470.0 nm), line f (λ=510.0 nm), line e (λ=555.0 nm), line d (λ=610.0 nm) and line e (λ=650.0 nm) are shown in FIG. 8.

Generally, spherical aberration of visible light (with a wavelength between 400~700 nm) of the camera lens 100 in the first embodiment is within a range of −0.02 mm to 0.02 mm.

The sagittal field curvature and tangential field curvature shown in FIG. 9 are within a range of 0 mm to 0.01 mm.

The distortion in FIG. 10 falls within a range of 0% to 2%. Spherical aberration, field curvature, and distortion are strictly controlled in the first embodiment of the camera lens 200.

The aforementioned camera lens 100 has a compact size and excellent optical performance even as a miniature camera lens. The camera lens 100 works to keep chromatic aberrations at a minimum while reducing the overall length of the camera lens.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A camera lens having an optical axis, the camera lens comprising:
   a first lens having a positive refractive power;
   a second lens having a positive refractive power;
   a third lens having a negative refractive power;
   a fourth lens having a positive refractive power;
   a fifth lens having a negative refractive power;
   an image sensor; and
   the first lens, the second lens, the third lens, the fourth lens, the fifth lens and the image sensor being arranged in sequence from an object side to an image side; wherein an axial distance between the third lens and the fourth lens is CT34, an axial distance between the fourth lens and the fifth lens is CT45, the following condition is satisfied: 8.3<CT34/CT45<15.7.

2. The camera lens of claim 1, wherein the camera lens further comprises a sixth lens having a negative refractive power; the sixth lens is arranged between the fifth lens and the image sensor, and the sixth lens comprises an eleventh surface facing the image side and a twelfth surface facing the image side, wherein a central thickness between the first surface and the twelfth surface is T0, the image sensor comprises an image plane, and a central thickness between the twelfth surface and the image plane is D, and the following condition is satisfied: 0.21<D/T0<0.26.

3. The camera lens of claim 1, wherein the camera lens further comprises an optical filter, and the optical filter is arranged between the sixth lens and the image sensor.

4. The camera lens of claim 3, wherein the maximum effective diameter of the fourth surface intersects with the optical axis and the intersection is O1, and an axial distance between the third surface and O1 is T2, and the following condition is satisfied: 0.12 mm<T2<0.22 mm.

5. The camera lens of claim 1, wherein the maximum effective diameter of the eighth surface intersects with the optical axis and the intersection is O2, and an axial distance between the seventh surface and intersection O2 is T4, and the following condition is satisfied: 0.13 mm<T4<0.22 mm.

6. The camera lens of claim 1, wherein a central thickness of the second lens is CT2, a central thickness of the third lens is CT3, and the following condition is satisfied: 0.48<CT3/CT2<0.53.

7. The camera lens of claim 1, wherein a focal length of the first lens is F1, a focal length of the second lens is F2, a focal length of the third lens is F3, the focal length of the fourth lens is F4, a focal length of the fifth lens is F5, and a focal length of the sixth lens is F6, and the following condition is satisfied: 0.2 mm<|F1+F2+F4|/|F3+F5+F6|<0.47 mm.

8. The camera lens of claim 7, wherein the fourth lens comprises a seventh surface facing the object side and an eighth surface facing the image side, the fifth lens comprises a ninth surface facing the object side and a tenth surface facing the image side, the sixth lens comprises an eleventh surface facing the object side and a twelfth surface facing the image side; and a curvature radius of the seventh surface is L4R1, a curvature radius of the seventh surface is L5R1, a curvature radius of the eleventh surface is L6R1, and the following condition is satisfied: L5R1/F5<L4R1/F4<L6R1/F6<0.

9. The camera lens of claim 8, wherein the first lens comprises a first surface facing the object side and a second surface facing the image side, the second lens comprises a third surface facing the object side and a fourth surface facing the image side, the third lens comprises a fifth surface facing the object side and a sixth surface facing the image side, and a curvature radius of the first surface is L1R1, a curvature radius of the third surface is L3R1, a curvature radius of the ninth surface is L5R1, and the following condition are satisfied:

$2.31 < L1R1/F1 < 2.84;$ $-0.67 < L2R1/F2 < 0.72;$ $0.13 < L3R1/F3 < 0.21;$ $-10.2 < L4R1/F4 < -8.77;$ $-22.3 < L5R1/F5 < -19.7;$ and $-3.54 < L6R1/F6 < 2.21.$ 10. The camera lens of claim 1, wherein the maximum image height of the camera lens is ImH, and the following condition is satisfied: 1.26<ImH/T0<2.51.

11. The camera lens of claim 2, wherein the camera lens meets a criterion of $30 < Vd3 - Vd2 < 50;$ wherein Vd2 denoting an Abbe constant of the second lens; Vd3 denoting an abbe constant of the third lens.

12. The camera lens of claim 2, wherein the camera lens meets a criterion of $30 < Vd6 - Vd5 < 50;$ wherein Vd5 denoting an Abbe constant of the fifth lens; and Vd6 denoting an Abbe constant of the sixth lens.

13. The camera lens of claim 2, wherein the camera lens meets a criterion of $70 < Vd1 + Vd4 < 90;$ wherein Vd1 denoting an Abbe constant of the first lens; and Vd4 denoting an Abbe constant of the fourth lens.

14. The camera lens of claim 5, wherein the camera lens further satisfies: 78°<2ω<90°, wherein ω is a half viewing angle of the camera lens.

15. The camera lens of claim 6, wherein the camera lens further comprises an aperture being arranged at the object side of the first lens, and the aperture value meets a criterion of F/NO<2.21.

16. The camera lens of claim 7, wherein the first surface, the second surface, the third surface, the fourth surface, the fifth surface, the sixth surface, the ninth surface, the tenth surface, the eleventh surface and the twelfth surface are aspheric surfaces.

17. The camera lens of claim 9, wherein the first lens, the second lens, the third lens, the fourth lens, the fifth lens and the sixth lens are made from an acrylic resin.

* * * * *